2,902,489

NITROGEN CONTAINING ORGANO MANGANESE COMPOUNDS

Thomas H. Coffield, Farmington, and Normand Hebert, Detroit, Mich., assignors to Ethyl Corporation, New York, N.Y., a corporation of Delaware No Drawing. Application August 23, 1957
Serial No. 680,014

8 Claims. (Cl. 260—270)

The invention described herein relates to novel nitrogen-containing metal carbonyl compounds and particularly to a process for the preparation of nitrogen-containing manganese carbonyl compounds.

It is an object of this invention to provide a novel class of nitrogen-containing organometallic compounds. Another object is to provide a process for the preparation of organometallic nitrogen-containing manganese compounds. Other objects will become apparent from the description which follows.

A new and valuable class of manganese carbonyl compounds has been discovered. These comprise the organic non-ionic diamine manganese tricarbonyl halide compounds, which have the formula $AMn(CO)_3X$ where A represents 2 molecules of an organo mono amine or 1 molecule of an organo diamine and X is a halogen having an atomic number of at least 17, i.e. chlorine, bromine and iodine. The organic non-ionic diamine manganese tricarbonyl halide compounds of this invention are prepared by a novel process which comprises reacting an amine with a manganese pentacarbonyl halide compound. Illustrative of the process of this invention and the novel product obtained thereby, is the reaction of manganese pentacarbonyl bromide with aniline to prepare dianiline manganese tricarbonyl bromide. As will be pointed out in greater detail hereinafter, the compounds of this invention are important intermediates in the preparation of cyclopentadienyl manganese tricarbonyl compounds, and, in addition, have other important uses.

The process of this invention, that is, the reaction of a manganese pentacarbonyl halide with an amine is preferably conducted in the liquid phase at atmospheric pressure or above, and the process is conveniently carried out at the reflux temperature of the system. However, when the system has a low reflux temperature (below about 60° C.) the process can be carried out under pressure.

The temperatures employed vary from about room temperature to about 200° C. depending upon the nature of the starting materials and the stability of the product. Temperatures between about 60° C. and 150° C. are preferred and produce good yields of product.

When the amine employed in the above process is a solid, the process is conveniently conducted in an inert solvent. Desirable solvents include inert liquid hydrocarbon compounds including aliphatic and aromatic compounds, halogenated hydrocarbons, and the like which boil in the range from about 60 to about 150° C. When the nitrogen-containing compound employed is a liquid between these temperatures, the process is preferably conducted in the absence of a solvent.

Reaction times of from about five minutes to about 10 hours depending upon the nature of the amine employed are ordinarily sufficient to produce a high yield of nitrogen-containing manganese carbonyl halide compound.

The compounds of this invention are non-ionic, stable, crystalline solids of low volatility which are insoluble in water and slightly soluble in alcohols, ether, acetone, and hydrocarbon solvents. They decompose at excessive temperatures to manganous halides which are often coordinated with the amine molecules in a compound having the formula $AMnX_2$, where A and X are defined above.

The organic non-ionic diamine manganese tricarbonyl halide compounds of this invention are often insoluble in the amines from which they are derived, and thus the compound may be separated from the reaction mixture by cooling followed by filtration. Other usual methods of separation which will be evident to those skilled in the art are also employed to separate the desired product from the reaction mixture. Thus, since the compounds of this invention are generally water insoluble and since the nitrogen-containing compounds employed in their preparation are often water miscible, the desired compounds are often conveniently separated by the addition of cold water to the reaction mixture which causes crystallization of the product. It is often convenient to isolate the desired compound by evaporation of the liquid reactants which initiates crystallization of the desired product. Another method often employed in separating the product of this invention comprising evaporation of the liquid reactants followed by sublimation of the product under high vacuum.

The amines applicable to the process of this invention comprise the primary, secondary and tertiary amines, both aliphatic and aromatic, and heterocyclic organic compounds containing nitrogen as the only heterocyclic atom. Such amines are exemplified by methyl amine, diphenyl amine, propyl di(p-methylphenyl) amine, pyridine; and the like. Also applicable are basic nitrogen compounds having two nitrogen atoms per molecule, such as the diamines, trimethylene diamine, o-phenanthroline, N,N'-diphenyl dimethylene diamine, N,N-diethyl methylene diamine, N,N,N'N-tetrapropyl ethylene diamine; and the like.

Of the compounds represented by the formula $$AMn(CO)_3X$$

those having 2 molecules of a mono amine bonded to manganese constitute a preferred class, as it has been found that they are prepared in excellent yields from readily available nitrogen containing compounds. Di-(diphenyl amine) manganese tricarbonyl bromide, dianiline manganese tricarbonyl chloride and di(tripropyl amine) manganese tricarbonyl iodide are illustrative of these compounds.

Dianiline manganese tricarbonyl halide compounds represent a particularly preferred class of compounds of the present invention, as it has been found that these are easily prepared in good yield. The organic non-ionic diamine manganese tricarbonyl bromide compounds are preferred for laboratory use as they are most readily prepared in the laboratory; however, for large scale operation the organic non-ionic diamine manganese tricarbonyl chloride compounds are preferred as they are less expensive to prepare on a large scale.

The manganese pentacarbonyl halides, which are reactants in the process of this invention can be derived from manganese carbonyl. Manganese carbonyl itself is prepared by any one of several processes, for example, by reacting carbon monoxide with an intermediate prepared from an aryl Grignard reagent and a manganese halide. The compound exists as the dimer, 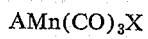 $[Mn(CO)_5]_2$ which is insoluble in water but soluble in organic solvents and is particularly soluble in acetone. The manganese carbonyl halides are prepared from manganese carbonyl through halogenation. Thus, manganese carbonyl bromide is prepared by reacting manganese carbonyl with bromine in a solvent such as carbon tetrachloride.

The process of this invention is illustrated by the following non-limiting examples in which all parts and percentages are by weight.

Example I

Eighteen parts of manganese pentacarbonyl bromide, $Mn(CO)_5Br$, prepared by the bromination of manganese carbonyl, was admixed with 50 parts of aniline in 175 parts of dried toluene. The mixture was heated to reflux and immediately cooled to room temperature. The product separated from the solution and was recovered by filtration. It was recrystallized from absolute methanol to yield 23 parts of bromo manganese dianiline tricarbonyl, an 86 percent yield based on the amount of manganese pentacarbonyl bromide reacted. Elemental analysis of the compound showed that it contained 6.52 percent nitrogen and 14.0 percent manganese which compares very favorably with a calculated composition of 6.92 percent nitrogen and 13.6 percent manganese. The compound is a yellow-orange crystalline solid which sublimes at 140 to 150° C. at about 1 millimeter of pressure with slight decomposition. When heated at atmospheric pressure, the compound does not melt at temperatures up to about 225° C. Infrared analysis showed the compound to contain a mono substituted aromatic nucleus and the spectra contained the bands characteristic of a manganese carbonyl.

Example II

Twenty parts of manganese pentacarbonyl bromide in 30 parts of pyridine was heated to 60° C. and maintained at this temperature for 5 minutes. The solution was cooled and cold water was added to precipitate bromo manganese dipyridine tricarbonyl. Twenty-two parts of this compound, representing a conversion of 79.5 percent, was recovered. Elemental analysis indicated that the compound contained 42.1 percent carbon, 7.24 percent nitrogen, 20.8 percent bromine and 2.89 percent hydrogen. The calculated composition for this compound is 41.4 percent carbon, 7.4 percent nitrogen, 21.2 percent bromine and 2.65 percent hydrogen. Infrared analysis showed the absorption bands typical of a manganese carbonyl and also proved the presence of the pyridine. The analytical data confirms the formula $C_{13}H_{10}N_2BrMn$ or

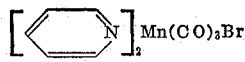

Example III

Iodo manganese pentacarbonyl (32 parts) prepared by the reaction of manganese carbonyl and iodine and 40 parts of triethyl amine are heated at reflux for 15 minutes with evolution of carbon monoxide. The reaction mixture is cooled and cold water is added. A good yield of iodo manganese di(triethyl amine) tricarbonyl results.

Example IV

The procedure of Example II was followed using 20 parts of manganese pentacarbonyl bromide and 250 parts of freshly distilled pyrrole. The reaction mixture was heated to 80° C. with constant agitation for 2 hours. The reaction was accompanied by evolution of a gas. The excess pyrrole was evaporated under vacuum. Bromo manganese dipyrrole tricarbonyl resulted.

Example V

Manganese pentacarbonyl chloride (23 parts) and 60 parts of amyl amine are heated at the reflux temperature (104° C.) for 3 hours. A good yield of chloro manganese di(amyl amine) tricarbonyl results.

Example VI

In a pressure resistant vessel equipped with heating means, temperature measuring device and means for maintaining reagents under agitation is placed 32 parts of manganese pentacarbonyl iodide, 12 parts of trimethyl amine and 280 parts of isooctane as a solvent. The vessel is sealed and the contents placed under agitation and heated to 100° C. This temperature is maintained for 10 hours after which time the vessel is cooled, the excess pressure vented and the contents are discharged into 200 parts of cold water. A good yield of iodo manganese di(trimethyl amine) tricarbonyl is separated from the reaction mixture.

Example VII

Manganese carbonyl chloride and diphenyl amine are heated to 159° C. in o-chloro toluene for 15 minutes to produce a good yield of chloro manganese di(diphenyl amine) tricarbonyl.

As pointed out above, and exemplified by various examples, the temperature employed in the process of this invention varies from about 20 to about 200° C. or above. The exact temperature employed in preparing a halo manganese diamine tricarbonyl compound depends in part upon the nature of the amine starting material, the solubility of the product and the nature of the solvent, if any, employed. It has been found that temperatures between about 60° C. and 150° C. lead to excellent yields of halo manganese diamine tricarbonyl compounds in most situations. Thus the temperature range of from 60° C. to about 150° C. constitutes a preferred embodiment of this invention.

In conducting the process of this invention, reaction times of from a few minutes to about 10 hours are found to be sufficient to produce high yields of product. Depending upon the amine and solvent employed, reaction times of from about 5 minutes to about 3 hours, at the reaction temperatures elucidated above, have been found to produce excellent results. When the reaction is conducted at the reflux temperature of the system, reflux times of from 5 minutes to an hour are preferred as employment of reaction times in this range produce an optimum yield of material with a minimum tie-up of equipment.

As indicated above, it is often desirable to conduct the process of this invention in the presence of an inert diluent or solvent. This is particularly true when the amine starting material is a solid with a relatively high melting point. Desirable solvents have a boiling range in the proper temperature for conducting the process of this invention, i.e., from about 60° C. to 150° C. However, it is to be emphasized that the preferred embodiment of this invention consists of reacting amine with a manganese pentacarbonyl halide in the absence of a solvent. When a solvent is employed any inert liquid hydrocarbon compound including aliphatic and aromatic compounds, halogenated hydrocarbons and other substituted aromatic compounds boiling in the appropriate temperature range are conveniently employed. Examples of such suitable solvents include benzene, 2-chloropentane, 3-chloropentane, 2-bromo-1-chloropropane, 1-iodo-2-methyl butane, bromobenzene, 1-chloro-4 fluorobenzene, chloroform, 2-6-dimethylheptane, 2-methylheptane, n-hexane, 1-chlorohexane, 3-ethyl hexane, 2-methyl hexane, ethylbenzenes; and the like.

When the process of this invention is conducted with an amine having a boiling point below about 60° C. it is often convenient to conduct the reaction at an elevated temperature above the boiling point of the amine at the prevailing pressure of the system. That is, if the optimum temperature is above the boiling point of the particular amine employed, the reaction is conducted in a sealed vessel so that this temperature may be realized.

The amines applicable to the process of this invention include primary, secondary, and tertiary amines, aliphatic, aromatic, and mixed aliphatic-aromatic. The term amine as used in this specification also includes heterocyclic basic nitrogen compounds. Therefore, the amines applicable to the process of this invention include primary aliphatic amines, secondary aliphatic amines, tertiary aliphatic amines, primary aromatic amines, secondary aromatic amines, tertiary aromatic amines, secondary mixed aliphatic-aromatic amines, tertiary mixed aromatic-aliphatic amines, heterocyclic nitrogen compounds containing 1-hetero nitrogen atom, heterocyclic nitrogen compounds containing 2-hetero nitrogen atoms, and aromatic, aliphatic and mixed aliphatic-aromatic diamines. When the amine employed is a diamine having up to about 3 carbon atoms separating the nitrogan atoms, the resulting halo manganese diamine tricarbonyl compounds are monomeric, and when more than 3 carbon atoms separate the nitrogen atoms the resulting halo manganese complex may possibly be polymeric.

A preferred class of halo manganese diamine tricarbonyl compound constitute those in which the diamine portion of the molecule contains up to 24 carbon atoms. These compounds are preferred as it has been found that they are prepared with a minimum of difficulty from readily available starting materials that are extremely useful intermediates in preparative organometallic chemistry. Examples of these preferred compounds include: di(methyl amine) manganese tricarbonyl bromide, di(dodecyl amine) manganese tricarbonyl chloride, di(dihexyl amine) manganese tricarbonyl iodide, di(dimethyl amine) manganese tricarbonyl bromide, di(ethyldecyl amine) manganese tricarbonyl chloride, di(phenylmethyl amine) manganese tricarbonyl iodide, di(iso-octyl amine) manganese tricarbonyl chloride, di(trimethyl amine) manganese tricarbonyl bromide, di(triisobutyl amine) manganese tricarbonyl chloride, dianiline manganese tricarbonyl iodide, di(p-biphenyl amine) manganese tricarbonyl chloride, di(diphenyl amine) manganese tricarbonyl bromide, di(m-hexylphenyl amine) manganese tricarbonyl bromide, di(N-phenyl N-methyl amine) manganese tricarbonyl iodide, di(N-phenyl N-dimethyl amine) manganese tricarbonyl bromide, dipyridine manganese tricarbonyl chloride, di(3-heptyl pyridine) manganese tricarbonyl bromide, trimethylene diamine manganese tricarbonyl bromide, dimethylene diamine manganese tricarbonyl bromide.

The novel compounds of this invention are useful as intermediates in the preparation of cyclopentadienyl manganese tricarbonyl compounds. This is accomplished by reacting the halo diamine manganese tricarbonyl compounds with an alkali metal cyclopentadienyl compound as illustrated by the following example.

*Example VIII*

Thirty-one parts of a 50 percent dispersion of sodium in light mineral oil was added to 3150 parts of freshly distilled tertiary-butanol containing 44.3 parts of freshly distilled cyclopentadiene. To this mixture was added 200 parts of dipyridine manganese tricarbonyl bromide. The reaction mixture was refluxed at about 83° C. for 3 hours. The tertiary-butanol was removed under vacuum and the residue was sublimed. Thirty-five parts of cyclopentadienyl manganese tricarbonyl having a melting point of from 76 to 78° C. was obtained and identified by infrared analysis. The yield was 32.4 percent based on dipyridine manganese tricarbonyl bromide.

In a similar manner, cyclopentadienyl manganese tricarbonyl is prepared by the reaction of dianiline manganese tricarbonyl bromide with lithium cyclopentadienide and ethyl cyclopentadienyl manganese tricarbonyl is produced for example from di(diethyl amine) manganese tricarbonyl chloride and ethylcyclopentadienyl potassium. This process for the preparation of cyclopentadienyl manganese tricarbonyl compounds is the subject of a patent application filed by us concurrently with the instant application and entitled "Preparation of Cyclopentadienyl Manganese Tricarbonyl Compounds."

The cyclopentadienyl manganese tricarbonyl compounds prepared from the compounds of this invention are outstanding anti-knock agents when added to liquid hydrocarbon fuels of the gasoline boiling range. For example, when methylcyclopentadienyl manganese tricarbonyl was added to a commercial gasoline having an initial boiling point of 94° F. and a final boiling point of 390° F. in amount sufficient to prepare a composition containing 1 gram of manganese per gallon, the octane number of the gasoline was raised from 83.1 to 92.3 as determined by the Research Method. The Research Method of determining the octane number of a fuel is generally accepted as a method of test which gives a good indication of fuel behavior in full-scale automotive engines under normal driving conditions and the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D-908-55 contained in 1956 edition of "ASTM Manual of Engine Test Methods" for rating fuels.

The above is merely illustrative of the antiknock effect realized by the use of a cyclopentadienyl manganese tricarbonyl compound. Good results are also obtained when other compounds prepared by the process of this invention, such as cyclopentadienyl manganese tricarbonyl, ethylcyclopentadienyl manganese tricarbonyl, idenyl manganese tricarbonyl and the like are employed in gasolines.

The non-ionic diamine manganese tricarbonyl halide compounds of this invention may be incorporated in paints, varnish, printing inks, synthetic resins of the drying oil type, oil enamels and the like, to impart excellent drying characteristics to such compositions. Generally speaking, from 0.01 to 0.05 percent of manganese as a compound of this invention is beneficially employed as a dryer in such a composition.

For example, to a typical varnish composition containing 100 parts ester gum, 173 parts of tung oil, 23 parts of linseed oil and 275 parts of white petroleum naptha is added 3.5 parts of dipyridine magnese tricarbonyl bromide. The resulting varnish composition is found to have excellent drying characteristics. Especially good results are obtained when other drying oil compositions and other diamine manganese tricarbonyl halide compounds of this invention are employed.

We claim:

1. The halo manganese diamine tricarbonyl compound containing 2 atoms of nitrogen per molecule and having the formula $MnA(CO)_3X$ wherein A represents a moiety selected from the class consisting of (1) 2 molecules of a monoamine selected from the group consisting of primary, secondary and tertiary aromatic, saturated aliphatic, and mixed aromatic-saturated aliphatic monoamines (2) 2 molecules of a basic heterocyclic compound having a single trivalent nitrogen as the only hetero atom and (3) 1 molecule of a saturated aliphatic diamine having only 2 nitrogen atoms separated by from 1 to 3 carbon atoms; and X is a halogen having an atomic number of at least 17, said compound further characterized in that the moiety represented by A contains only carbon, hydrogen and nitrogen and has up to 24 carbon atoms.

2. The dipyridine manganese tricarbonyl halide compound having the formula $MnA(CO)_3X$ wherein A represents 2 molecules of pyridine and X is a halogen having an atomic number of at least 17.

3. Dipyridine manganese tricarbonyl bromide.

4. The process for the preparaton of the halo manganese diamine tricarbonyl compound containing 2 atoms of nitrogen per molecule and having the formula $MnA(CO)_3X$ wherein A represents a moiety selected from the class consisting of (1) 2 molecules of a monoamine selected from the group consisting of primary, secondary and tertiary aromatic, saturated aliphatic, and mixed aromatic-saturated aliphatic monoamines, (2) 2 molecules of a heterocyclic compound having a single trivalent nitrogen as the only hetero atom and (3) 1 molecule of a saturated aliphatic diamine having only 2 nitrogen atoms separated by from 1 to 3 carbon atoms; and X is a halogen having an atomic number of at least 17, said compound further characterized in that the moiety represented by A contains only carbon, hydrogen and nitrogen and has up to 24 carbon atoms; which process comprises reacting the amine represented by A with a manganese pentacarbonyl halide at temperatures up to 200° C.

5. The process for the preparation of dipyridine manganese tricarbonyl bromide which comprises reacting pyridine with manganese pentacarbonyl bromide at temperatures up to 200° C.

6. The compound of claim 1 wherein said halogen is bromine.

7. The halo manganese dianiline tricarbonyl compound having the formula $(C_6H_5NH_2)_2Mn(CO)_3X$ where X is a halogen having an atomic number of at least 17.

8. The compound of claim 7 where said halogen is bromine.

No references cited.